(12) United States Patent
Nakajima et al.

(10) Patent No.: US 11,662,893 B2
(45) Date of Patent: May 30, 2023

(54) DISPLAY CONTROL METHOD AND INFORMATION PROCESSING APPARATUS

(71) Applicant: FUJITSU LIMITED, Kawasaki (JP)

(72) Inventors: Kenji Nakajima, Machida (JP); Katsuhiko Akiyama, Kawasaki (JP); Masashi Uyama, Kako (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/111,023

(22) Filed: Dec. 3, 2020

(65) Prior Publication Data

US 2021/0232294 A1 Jul. 29, 2021

(30) Foreign Application Priority Data

Jan. 27, 2020 (JP) .............................. JP2020-011006

(51) Int. Cl.
| | | |
|---|---|---|
| *G06F 3/048* | (2013.01) | |
| *G06F 3/04845* | (2022.01) | |
| *G06F 3/04883* | (2022.01) | |
| *G06F 3/0354* | (2013.01) | |

(52) U.S. Cl.
CPC ...... *G06F 3/04845* (2013.01); *G06F 3/04883* (2013.01); *G06F 3/03545* (2013.01); *G06F 2203/04105* (2013.01)

(58) Field of Classification Search
CPC . G06F 3/04883; G06F 3/0488; G06F 3/03545
See application file for complete search history.

(56) References Cited

U.S. PATENT DOCUMENTS

| | | | | |
|---|---|---|---|---|
| 5,864,636 A | * | 1/1999 | Chisaka ............... | G06V 30/347 382/315 |
| 5,986,639 A | * | 11/1999 | Ozawa ................ | G06F 3/04842 345/157 |
| 6,448,987 B1 | * | 9/2002 | Easty ..................... | G11B 27/34 715/845 |
| 8,913,014 B2 | * | 12/2014 | Naganawa .......... | G06F 3/03545 345/157 |
| 11,119,622 B2 | * | 9/2021 | Kim ...................... | G06F 3/0481 |

(Continued)

FOREIGN PATENT DOCUMENTS

| | | |
|---|---|---|
| JP | 2012-198798 A | 10/2012 |
| JP | 2012-208720 A | 10/2012 |

OTHER PUBLICATIONS

Brown et al., The whiteboard environment: an electronic sketchpad for data structure design and algorithm description; 2022; IEEE; 8 pages.*

(Continued)

*Primary Examiner* — Linh K Pham
(74) *Attorney, Agent, or Firm* — ArentFox Schiff LLP

(57) ABSTRACT

A non-transitory computer-readable recording medium has stored therein a program that causes a computer to execute a process, the process comprising: when a processing mode is a drawing mode, receiving an operation position instruction started in a drawing region; and changing the processing mode to a move mode of moving the drawing region according to movement of an operation position indicated by the operation position instruction to a predetermined region with a side that forms the drawing region as a reference while the operation position instruction is continued.

8 Claims, 7 Drawing Sheets

(56) References Cited

U.S. PATENT DOCUMENTS

| | | | |
|---|---|---|---|
| 2004/0021790 A1* | 2/2004 | Iga | H04N 1/04 |
| | | | 348/333.12 |
| 2004/0080531 A1* | 4/2004 | Berstis | G06F 16/958 |
| | | | 707/E17.116 |
| 2005/0166159 A1* | 7/2005 | Mondry | G06F 3/0486 |
| | | | 715/769 |
| 2005/0166163 A1* | 7/2005 | Chang | G06F 3/0304 |
| | | | 382/103 |
| 2005/0237311 A1* | 10/2005 | Nakajima | G06F 3/04883 |
| | | | 345/173 |
| 2008/0068345 A1* | 3/2008 | Naganawa | G06F 3/03545 |
| | | | 345/173 |
| 2008/0068346 A1* | 3/2008 | Naganawa | G06F 3/03545 |
| | | | 345/173 |
| 2008/0166049 A1* | 7/2008 | Wang | G06F 3/04883 |
| | | | 382/189 |
| 2009/0289911 A1* | 11/2009 | Nagai | G06F 3/041 |
| | | | 345/173 |
| 2010/0017489 A1* | 1/2010 | Birnbaum | G06F 3/0346 |
| | | | 715/702 |
| 2010/0057235 A1* | 3/2010 | Wang | G06F 1/1626 |
| | | | 715/810 |
| 2010/0248788 A1* | 9/2010 | Yook | G06F 3/04886 |
| | | | 455/566 |
| 2011/0093778 A1* | 4/2011 | Kim | G06F 3/04815 |
| | | | 715/702 |
| 2011/0141044 A1* | 6/2011 | Suzukawa | G06F 1/1649 |
| | | | 345/173 |
| 2011/0191718 A1* | 8/2011 | Hinckley | G06T 11/60 |
| | | | 715/835 |
| 2012/0056849 A1* | 3/2012 | Kasahara | G06F 3/044 |
| | | | 345/173 |
| 2012/0249415 A1 | 10/2012 | Nakajima et al. | |
| 2012/0287065 A1* | 11/2012 | Oshinome | G06F 3/04883 |
| | | | 345/173 |
| 2013/0212600 A1* | 8/2013 | Harsh | G06F 9/485 |
| | | | 719/318 |
| 2013/0325958 A1* | 12/2013 | Mizuki | G06Q 10/10 |
| | | | 709/204 |
| 2013/0346910 A1* | 12/2013 | Mason | G06F 3/0482 |
| | | | 715/781 |
| 2014/0195957 A1* | 7/2014 | Bang | G06F 3/04883 |
| | | | 715/773 |
| 2015/0007100 A1* | 1/2015 | Wang | G06F 3/017 |
| | | | 715/783 |
| 2015/0067504 A1* | 3/2015 | Kim | G06F 3/0482 |
| | | | 715/708 |
| 2015/0084919 A1* | 3/2015 | Sugimura | G06F 3/04166 |
| | | | 345/174 |
| 2015/0128077 A1* | 5/2015 | Cha | G06F 3/0488 |
| | | | 715/765 |
| 2015/0169141 A1* | 6/2015 | Kim | G06F 3/0482 |
| | | | 715/769 |
| 2016/0357430 A1* | 12/2016 | Migos | G06F 3/0481 |
| 2017/0003919 A1* | 1/2017 | Imai | G06F 3/041 |
| 2017/0091153 A1* | 3/2017 | Thimbleby | G06F 1/1694 |
| 2017/0329509 A1* | 11/2017 | Lee | G06F 3/04883 |
| 2018/0203597 A1* | 7/2018 | Lee | H04M 1/72403 |
| 2018/0204388 A1* | 7/2018 | Tanaka | G06T 19/20 |
| 2018/0275814 A1* | 9/2018 | Hosokawa | G06F 3/14 |
| 2020/0134890 A1* | 4/2020 | Zhang | G06F 3/03545 |
| 2021/0247884 A1* | 8/2021 | Han | G06F 3/04845 |

OTHER PUBLICATIONS

Keefe et al., Drawing on Air: Input Techniques for Controlled 3D Line Illustration, 2007, IEEE, 14 pages.*

The extended European search report, from the European Patent Office in counterpart European Application No. 20210016.0, dated May 10, 2021.

Communication from the European Patent Office in European Patent Application No. 20210016.0, dated Nov. 8, 2022.

* cited by examiner

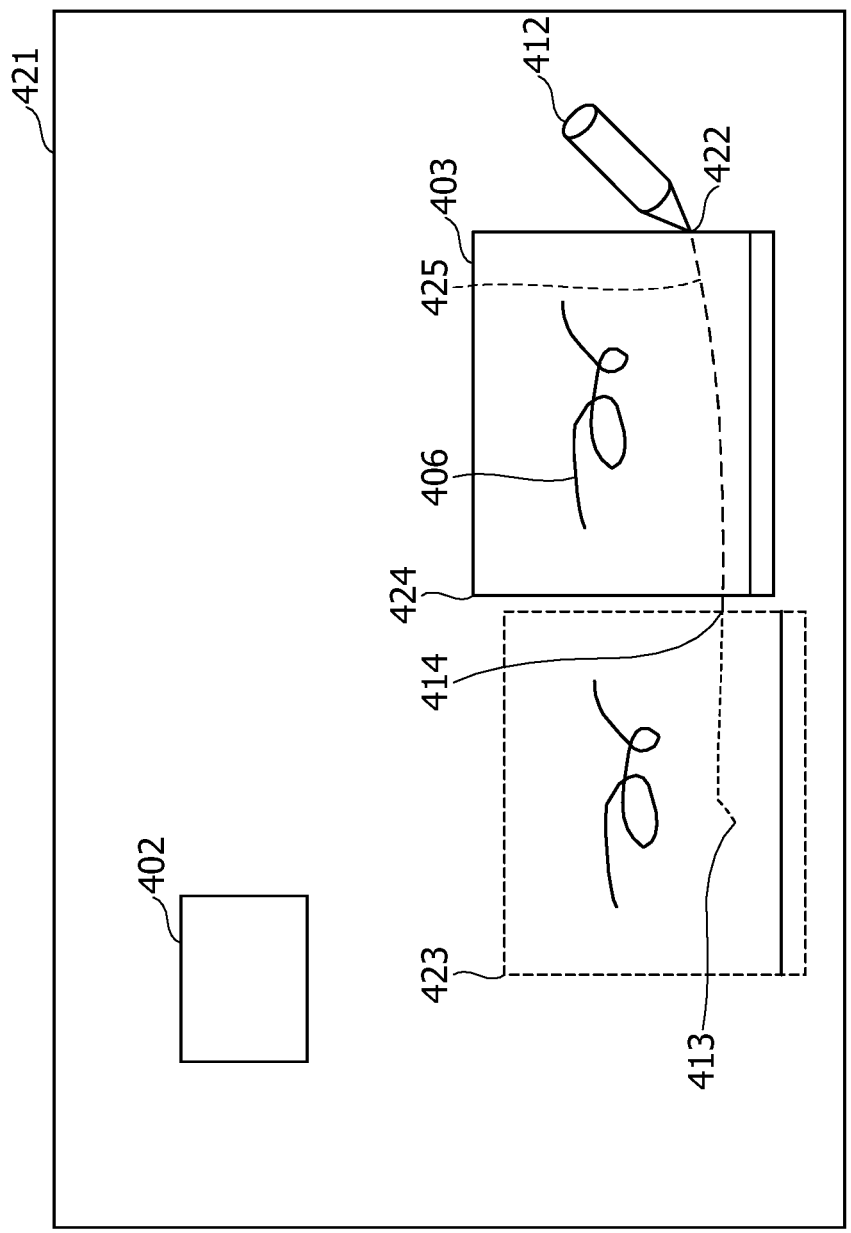

DISPLAY CONTROL METHOD AND INFORMATION PROCESSING APPARATUS

CROSS-REFERENCE TO RELATED APPLICATION

This application is based upon and claims the benefit of the prior Japanese Patent Application No. 2020-011006, filed on Jan. 27, 2020, the entire contents of which are incorporated herein by reference.

FIELD

The embodiment discussed herein is related to a display control method and an information processing apparatus.

BACKGROUND

A technique of the related art is disclosed in which a user may draw a character or the like on a display object such as, for example, a virtual sticker note by a user operation using a pen-type device, or move the position of the display object.

The display object is moved in response to an operation such as dragging when a system mode setting is set to a move mode, and is drawn in response to an operation such as dragging when the mode setting is set to a drawing mode (an edit mode or an input mode).

Related techniques are disclosed in, for example, Japanese Laid-Open Patent Publication No. 2012-198798.

SUMMARY

According to an aspect of the embodiment, a non-transitory computer-readable recording medium has stored therein a program that causes a computer to execute a process, the process comprising: when a processing mode is a drawing mode, receiving an operation position instruction started in a drawing region; and changing the processing mode to a move mode of moving the drawing region according to movement of an operation position indicated by the operation position instruction to a predetermined region with a side that forms the drawing region as a reference while the operation position instruction is continued.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4C is a diagram illustrating a process executed in the information processing apparatus according to the embodiment.

DESCRIPTION OF EMBODIMENT

Figure 1:
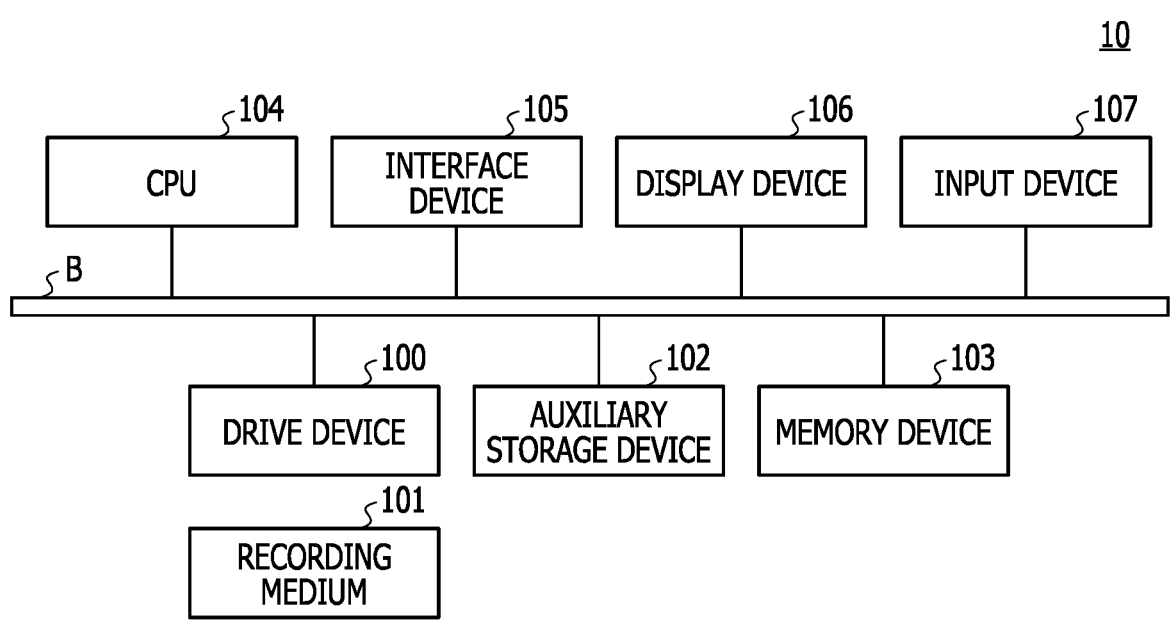
FIG. 1 is a diagram illustrating a hardware configuration example of an information processing apparatus according to an embodiment.

However, in the technique of the related art, for example, when the user moves the display object of the drawing mode, a complicated operation is required to perform an operation for switching the mode setting set in the display object to the move mode, and then perform an operation such as dragging.

Hereinafter, an embodiment of the present disclosure will be described with reference to the drawings.

<Hardware Configuration>

FIG. 1 is a diagram illustrating a hardware configuration example of an information processing apparatus 10 according to an embodiment. The information processing apparatus 10 is, for example, a computer such as a tablet (slate PC), a smartphone, a personal computer, a server, or the like. When the information processing apparatus 10 is a server, the information processing apparatus 10 may be connected to a terminal having a display device 106, an input device 107, and the like via a communication network, for example, a carrier network such as the Internet and 5G, a wireless LAN (Local Area Network), a LAN, or the like.

The information processing apparatus 10 of FIG. 1 includes a drive device 100, an auxiliary storage device 102, a memory device 103, a CPU 104, an interface device 105, a display device 106, an input device 107, and the like, which are interconnected by a bus B.

A program (drawing program) for implementing a process in the information processing apparatus 10 is provided by a recording medium 101. When the recording medium 101 recording the program is set in the drive device 100, the program is installed in the auxiliary storage device 102 from the recording medium 101 via the drive device 100. However, it is not always necessary to install the program from the recording medium 101, but the program may be downloaded from another computer via a network. The auxiliary storage device 102 stores the installed program and also stores necessary files and data.

When an instruction to activate the program is given, the memory device 103 reads and stores the program from the auxiliary storage device 102. The CPU 104 implements a function related to the information processing apparatus 10 according to the program stored in the memory device 103. The interface device 105 is used as an interface for connecting to the network.

The display device 106 is a display that displays a GUI (Graphical User Interface) and the like according to a program. The display device 106 may be, for example, a touch panel, a liquid crystal display, a projector, or the like.

The input device 107 receives an input of various operation instructions. The input device 107 includes, for example, a pointing device that receives an input of a position (coordinates on a screen) designated by a user. In this case, the input device 107 may be, for example, a touch panel of a capacitance type touch or the like that detects a position touched by a user's finger or a stylus pen, and a touch pad. Alternatively, the input device 107 may be, for example, a mouse, a trackball, or the like. In addition, the input device 107 may be, for example, an input system in which a pen-type device emits an infrared ray or the like when coming into contact with a wall surface or the like on which a display screen is projected by a projector, and detects a contacted position with an infrared sensor or the like.

In addition, an example of the recording medium 101 may include a portable recording medium such as a CD-ROM, a DVD disc, a USB memory, or the like. Further, an example of the auxiliary storage device 102 may include an HDD (Hard Disk Drive), a flash memory, or the like. Both the recording medium 101 and the auxiliary storage device 102 correspond to a computer-readable recording medium.

<Functional Configuration>

Figure 2:
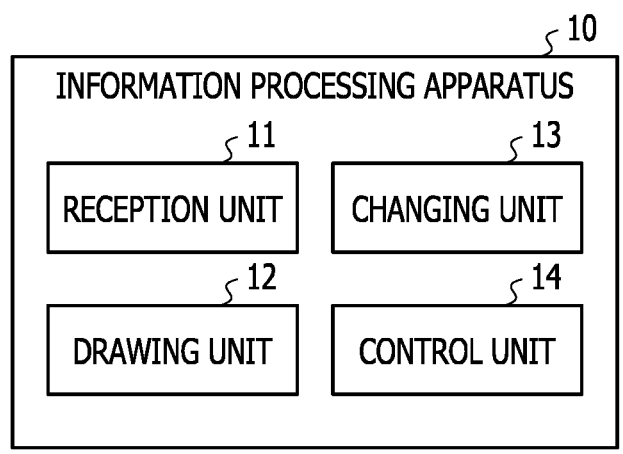
FIG. 2 is a diagram illustrating an example of the functional configuration of the information processing apparatus according to the embodiment.

Next, the functional configuration of the information processing apparatus 10 according to the embodiment will be described with reference to FIG. 2. FIG. 2 is a diagram illustrating an example of the functional configuration of the information processing apparatus 10 according to the embodiment.

The information processing apparatus 10 includes a reception unit 11, a drawing unit 12, a changing unit 13, and a control unit 14. The functions of these units may be implemented by cooperation of one or more programs installed in the information processing apparatus 10 and the CPU 104 of the information processing apparatus 10.

The reception unit 11 receives an input of a variety of information from a user. The reception unit 11 receives, for example, an operation position instruction (e.g., a handwriting input operation) for a display object from the user.

The drawing unit 12 performs a drawing on the display object in response to the user's operation position instruction for the display object received by the reception unit 11.

The changing unit 13 changes a display position of the display object in response to a user's move operation for the display object received by the reception unit 11. Further, when a processing mode is a drawing mode, the changing unit 13 changes the processing mode to a move mode of moving a drawing region according to movement of the operation position to a predetermined region with a side that forms the drawing region as a reference while the operation position instruction started in the drawing region is continued. Further, when the continued operation position instruction is completed, the changing unit 13 may return the processing mode to the drawing mode.

The predetermined region may be, for example, a region outside the drawing region. Further, the predetermined region may be a region inside the drawing region and defined within a predetermined distance from the side. The control unit 14 executes various processes of the information processing apparatus 10.

<Processes>

Figure 3:
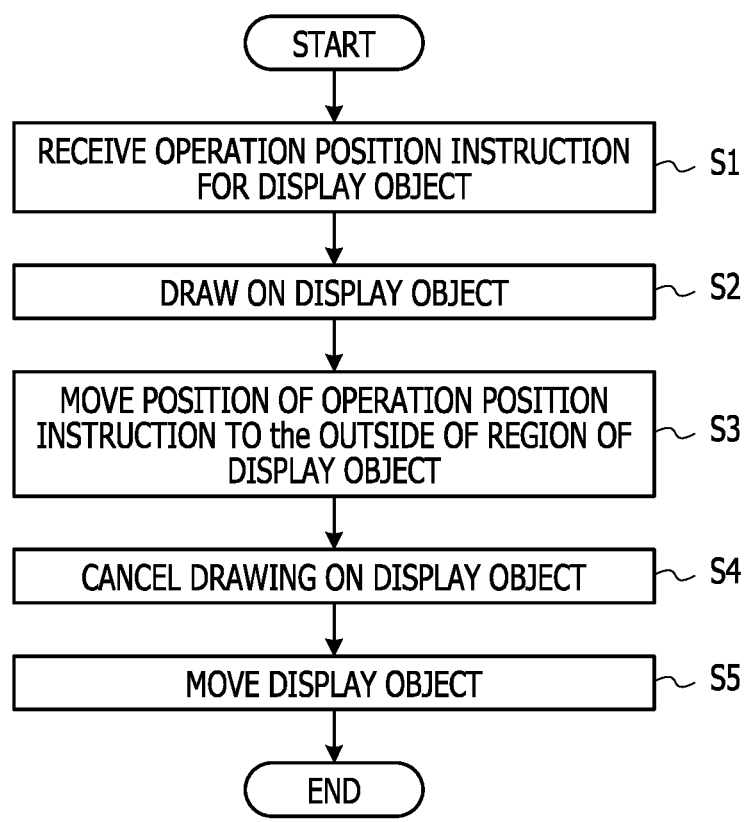
FIG. 3 is a flowchart illustrating an example of a process executed in the information processing apparatus according to the embodiment.

Next, an example of a process executed in the information processing apparatus 10 according to the embodiment will be described with reference to FIGS. 3 to 4D. FIG. 3 is a flowchart illustrating an example of a process executed by the information processing apparatus 10 according to the embodiment. FIGS. 4A to 4D are diagrams illustrating a process executed in the information processing apparatus 10 according to the embodiment.

In step S1, the reception unit 11 receives an operation position instruction for a display object from a user. Here, the reception unit 11 receives the operation position instruction for the display object on a display screen from the user using a pointing device such as a touch panel, a mouse, or the like.

Subsequently, the drawing unit 12 performs a drawing on the display object in response to the user's operation position instruction (step S2). Here, the drawing unit 12 may display, for example, a pixel at a position where the operation position instruction in the display object is received, with a predetermined color that is designated in advance by the user. Thus, for example, when the user re-traces on the display object such as a sticky note, a canvas, a window, or the like with a finger or a pen, a re-traced trajectory is displayed in a predetermined color, so that the user may input characters, figures, or the like by handwriting.

Subsequently, the changing unit 13 detects that the position of the operation position instruction by the user (the position designated by the operation position instruction) is moved from the inside of the region of the display object to the outside of the region of the display object while the operation position instruction is continued (step S3). Here, when the reception unit 11 receives the operation position instruction from a touch panel, the changing unit 13 may detect, for example, that a contact position is moved from the inside of the display object to the outside of the display object while the user's finger or pen keeps contacting (re-tracing) the screen.

In addition, when the reception unit 11 receives the operation position instruction from a mouse, the changing unit 13 may detect, for example, that a position of a cursor is moved from the inside of the display object to the outside of the display object while continuing the left click and the like.

Subsequently, the changing unit 13 cancels the drawing on the display object by the operation position instruction (step S4). Here, in an operation of contacting the finger or the like on the screen, moving the contact position while the contact is continued (while re-tracing the screen), and releasing the finger or the like from the screen (hereinafter, referred to as a "series of operation position instructions"), the changing unit 13 cancels the drawing by the series of operation position instructions when the contact position of the finger or the like is moved from the inside of the display object to the outside of the display object. The fact that the contact position has moved to the outside of the display object may be regarded as an indication that the continuous operation position instruction of the user is not for the purpose of drawing but for the purpose of moving the display object. At this time, since the trajectory drawn up to that point is unnecessary for the user, it is regarded to be canceled at this timing or a timing when the operation position instruction is completed (when the finger or the like leaves the touch panel or the left click of the mouse ends). Further, as a result, for example, when the display object is set to the drawing mode in which the drawing may be performed in the region inside the display object, the drawing according to the move operation by the user who misrecognizes the display object being set to the move mode may also be canceled.

In this case, the changing unit 13 may record, for example, information displayed on the display object when a series of operation position instructions is started, as an image or the like. Then, in the case of canceling the drawing by the series of operation position instructions, the changing unit 13 may return to the display content before the series of operation position instructions is performed, by displaying the image or the like recorded in the region of the display object when the series of operation position instructions is started.

Alternatively, the drawing unit 12 performs a drawing by a series of operation position instructions on a transparent object that is superimposed on the display object, and when the series of operation position instructions is completed, performs a drawing by synthesizing the drawing on the transparent object on the display object. Then, when canceling the drawing by the series of operation position instructions, the changing unit 13 may erase the transparent object without synthesizing the drawing on the transparent object on the display object.

Subsequently, the changing unit 13 changes (moves) the display position of the display object (step S5) and ends the process.

Figure 4A:
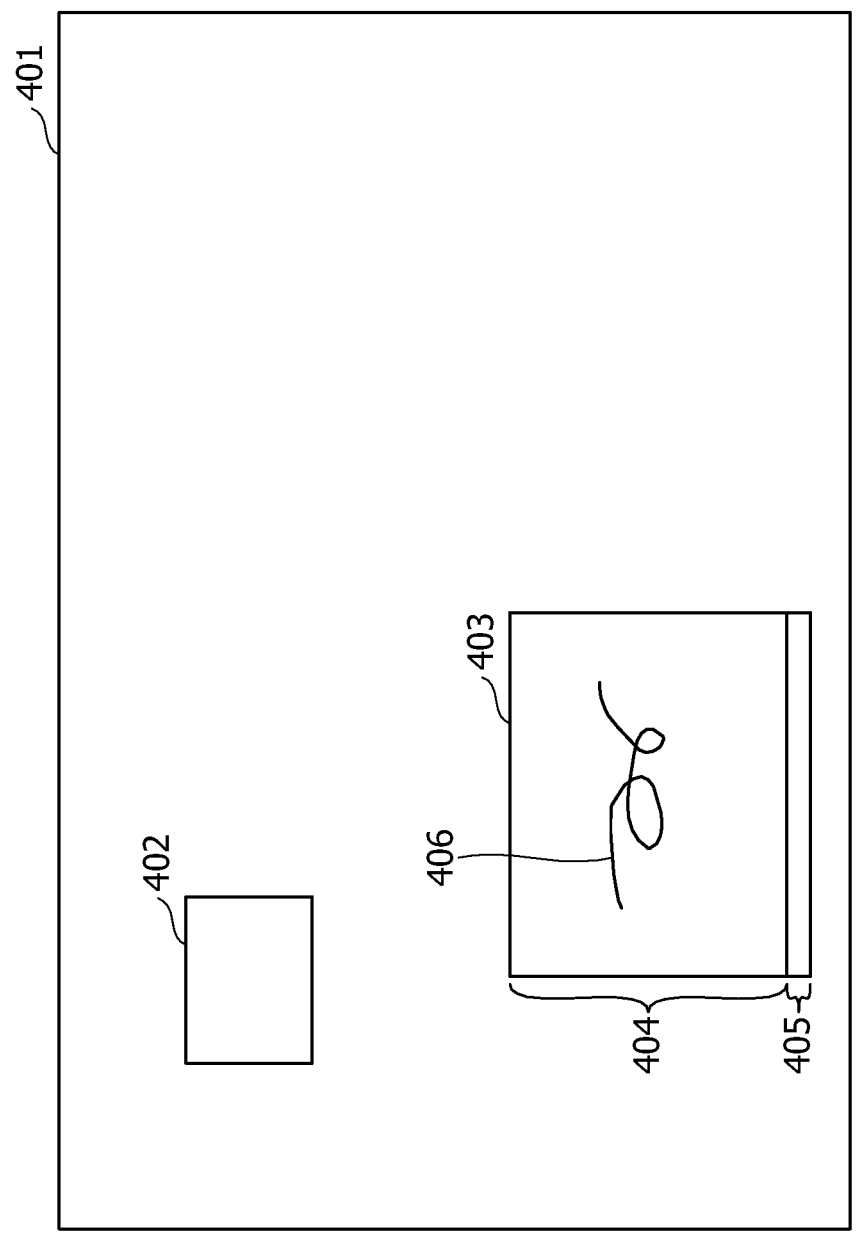
FIG. 4A is a diagram illustrating a process executed in the information processing apparatus according to the embodiment.

In the example of FIG. 4A, the control unit 14 displays a second display object 402 and a first display object 403 on a display screen 401. In the example of FIG. 4A, the second display object 402 is a display object set in the move mode in which a display position may be moved by a predetermined move operation. The predetermined move operation is, for example, a swipe that is an operation of sliding a finger while touching the screen, a flick that is an operation of sliding the finger as if flipping the screen and then releasing the finger from the screen, a drag that is an operation of moving a cursor while pressing a mouse button, or the like.

The first display object 403 is a display object that is set to the drawing mode when a user gives a predetermined operation position instruction. In the example of FIG. 4A, a line 406 is drawn by handwriting in a drawable region 404 of the first display object 403.

The control unit 14 may move the position of the first display object 403 set to the drawing mode when the user performs a predetermined move operation on a region 405 (bar or handle) of the first display object 403. Since the region 405 of the first display object 403 is not essential, the region 405 may not be displayed.

When the user performs a predetermined operation such as tapping or double-clicking on the display object set to the move mode, the control unit 14 may enlarge the display object and change the display object to the drawing mode. Thus, for example, the handwriting input operation when drawing on the display object may be performed more easily.

When the user performs a predetermined operation such as tapping or double-clicking on the display object set to the drawing mode, the control unit 14 may reduce the display object and change the display object to the move mode. Thus, for example, sticky notes and the like for which handwriting input has been completed may be arranged more easily.

Figure 4B:
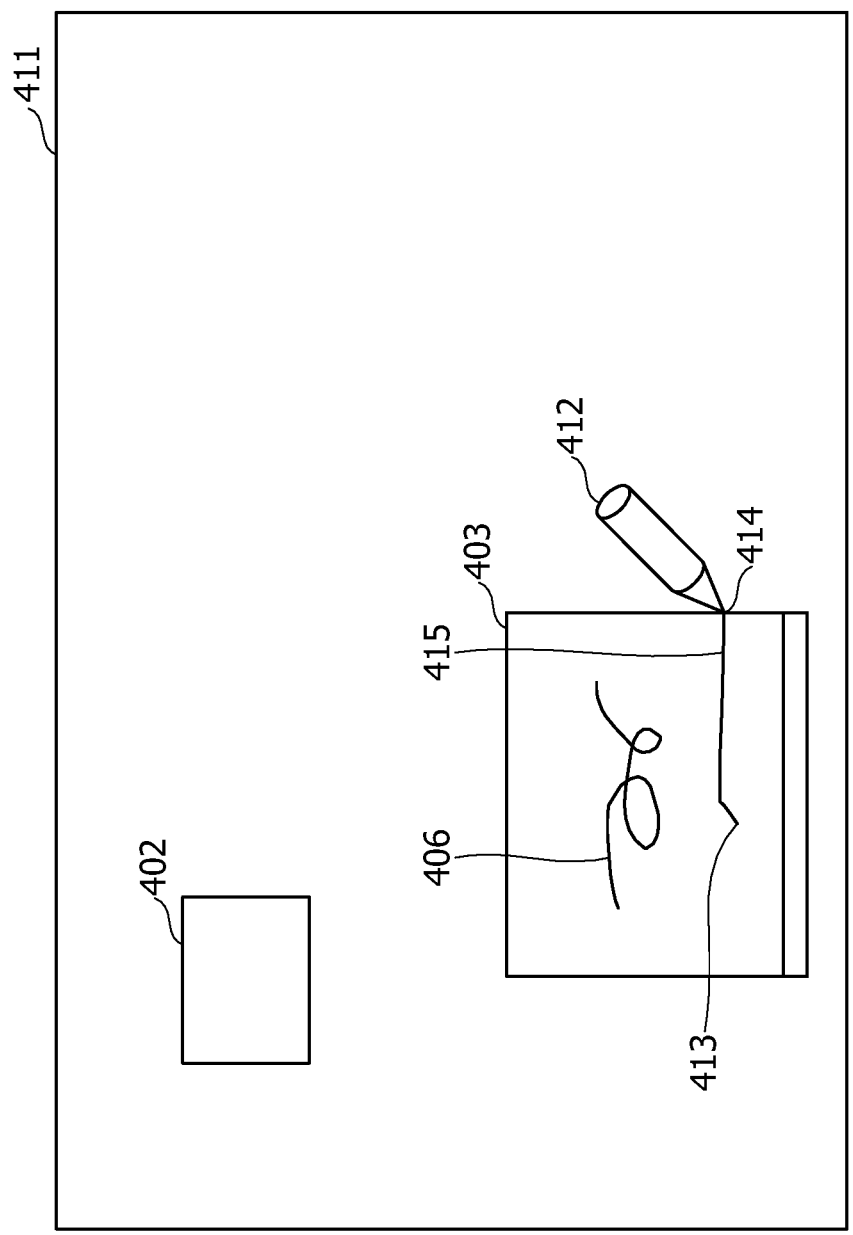
FIG. 4B is a diagram illustrating a process executed in the information processing apparatus according to the embodiment.

An example of a display screen 411 of FIG. 4B represents that, in the display screen 401 of FIG. 4A, the operation position instruction by a pen-type device 412 is started at a position 413 in the region of the first display object 403, and the position of the operation position instruction by the pen-type device 412 has been moved to a position 414 at the end of the first display object 403 while the operation position instruction is continued. Therefore, the trajectory (handwriting) of the position of the operation position instruction by the pen-type device 412 from the position 413 to the position 414 is drawn by a line 415.

In an example of a display screen 421 of FIG. 4C, in the display screen 411 of FIG. 4B, the position of the operation position instruction is moved to a position 422 outside the region of the first display object 403 through a trajectory 425 after deviating from the position 414 (an example of a "position deviated from a region") of the region of the first display object 403 while the operation position instruction is continued.

Therefore, the line 415 drawn by the operation position instruction is deleted by the process of step S4 in FIG. 3. Further, the display position of the first display object 403 has been changed by the process of step S5 in FIG. 3.

Figure 4D:
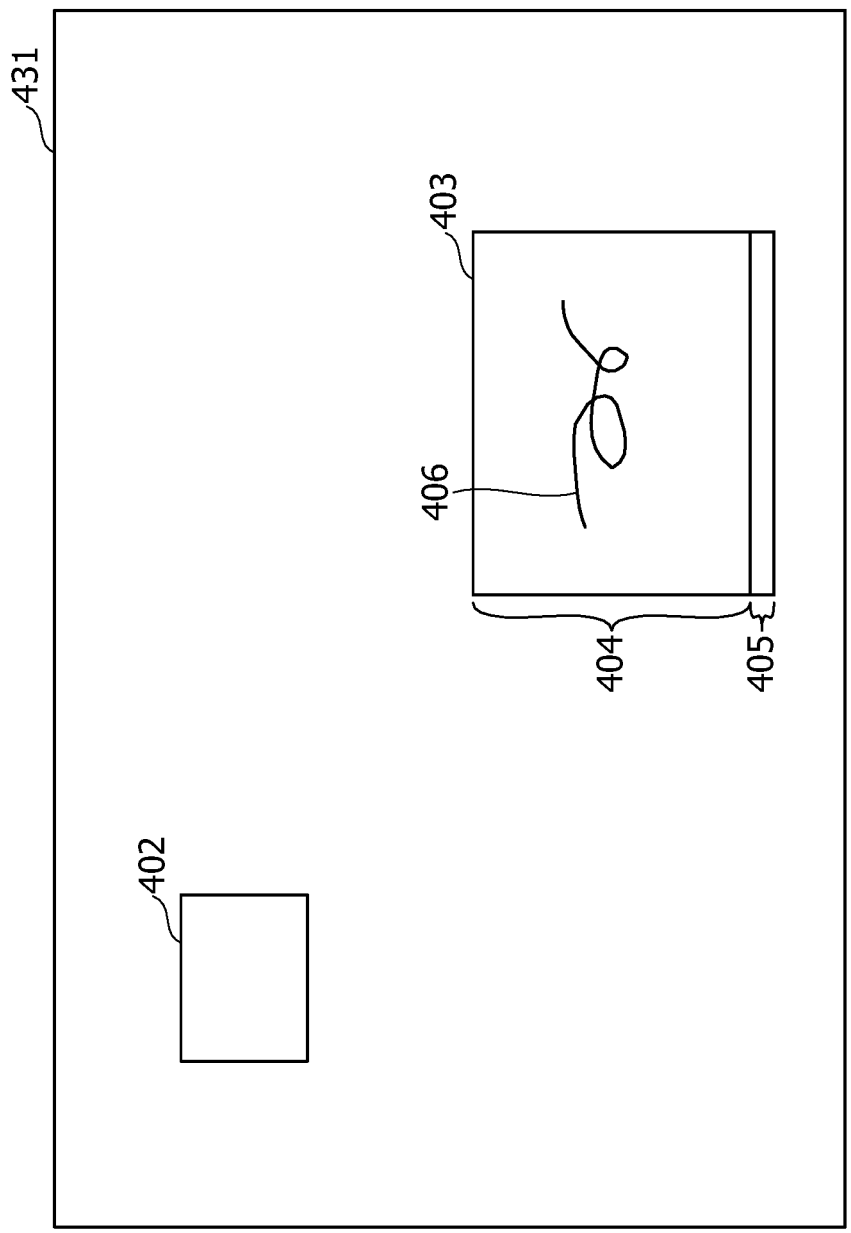
FIG. 4D is a diagram illustrating a process executed in the information processing apparatus according to the embodiment.

An example of a display screen 431 of FIG. 4D represents an example of a display screen when the operation position instruction by the pen-type device 412 is completed at the position 422 of the display screen 421 of FIG. 4C.

In the examples of FIGS. 4C and 4D, the changing unit 13 moves the first display object 403 so that the position 414 deviated from the region of the first display object 403 becomes the position 422 of the operation position instruction by the pen-type device 412. Therefore, the upper left end of the first display object 403 has been moved from a position 423 to a position 424. The distance and the direction (vector) from the position 423 to the position 424 are the same as the distance and the direction from the position 414 to the position 422, respectively. As a result, the user may move the display object with an operation feeling of pulling the display object according to the operation position instruction.

In addition, the changing unit 13 may move the first display object 403 so that the position 413 of the first display object 403 at which the operation position instruction is started becomes the position 422 of the operation position instruction by the pen-type device 412. Thus, for example, when the user performs the move operation on the display object, even when the display object is in the drawing mode, the display object may be moved to the same position as in the case where the display object is in the move mode.

Further, the changing unit 13 may move the first display object 403 so that a predetermined position in the region of the first display object 403 becomes the position 422 of the operation position instruction by the pen-type device 412. Thus, for example, the user may recognize that the display object in the drawing mode is being moved. In this case, the predetermined position may be, for example, the central portion (center position) of the first display object 403, the position of the upper left corner of the first display object 403, or the like.

<Determination on Whether Display Position May be Changed>

In the process of step S3 in FIG. 3, only when the position of the operation position instruction by the user is moved from the inside of the region of the display object to the outside of the region of the display object while the operation position instruction is continued, and satisfies a predetermined condition, the changing unit 13 may execute processes after step S4. Thus, for example, it is possible to prevent the drawing from being canceled due to an erroneous operation such as slight displacement of the position of the operation position instruction from the region of the display object during the operation position instruction.

In this case, when the distance (straight line distance) from the position 414 deviated from the region of the first display object 403 to the position 422 at which the operation position instruction is completed is equal to or larger than a threshold value (e.g., a length on the pixel coordinate corresponding to 5 cm on the screen), the changing unit 13 may determine that the position of the operation position instruction has moved to the outside of the region of the first display object 403.

Alternatively, when the length of the trajectory 425 in which the position of the operation position instruction is moved from the position 414 to the position 422 is equal to or larger than a threshold value (e.g., a length on the pixel coordinate corresponding to 10 cm on the screen), the changing unit 13 may determine that the position of the operation position instruction has moved to the outside of the region of the first display object 403.

Further, when the time required for the position of the operation position instruction to move from the position 414 to the position 422 is equal to or longer than a threshold value (e.g., 1 second), the changing unit 13 may determine that the position of the operation position instruction has moved to the outside of the region of the first display object 403.

Further, when the value of the ratio between the distance (straight line distance) from the position 414 to the position 422 and the distance (straight line distance) from the position 413 at which the operation position instruction is started in the region of the first display object 403 to the position 414 is equal to or larger than a threshold value (e.g., 1), the changing unit 13 may determine that the position of the operation position instruction has moved to the outside of the region of the first display object 403. This is because, for example, when the amount of movement of a position designated by the continued operation position instruction outside the drawing region or the like is equal to or larger than a certain amount with respect to the amount of movement inside the drawing region or the like, it may be considered that the user has the intention to move the first display object 403.

Further, when the value of the ratio between the length of the trajectory 425 of the position of the operation position instruction from the position 414 to the position 422 and the length of the trajectory (the line 415) of the position of the operation position instruction from the position 413 to the position 414 is equal to or larger than a threshold value (e.g., 1), the changing unit 13 may determine that the position of the operation position instruction has moved to the outside of the region of the first display object 403.

Further, when the value of the time until the position of the operation position instruction is moved from the position 414 to the position 422 and the value of the time until the position of the operation position instruction is moved from the position 413 to the position 414 is equal to or larger than a threshold value (e.g., 1), the changing unit 13 may determine that the position of the operation position instruction has moved to the outside of the region of the first display object 403.

<Cancellation of Change of Display Position>

The changing unit 13 may change the position of the display object by the process of steps S3 to S5 in FIG. 3 and then return the position of the display object to its original position in response to a predetermined operation from the user. Accordingly, for example, when the drawing position deviates from the region of the display object due to an erroneous operation by the user, the position of the display object may be returned to its original position (the position before the change).

In this case, for example, when the position designated by the operation position instruction stays at the position 422 as illustrated in FIG. 4C for a predetermined time (e.g., 3 seconds) while the operation position instruction is continued, the changing unit 13 may return the display object to the position of the first display object 403 of FIG. 4B.

Further, for example, when the position designated by the operation position instruction is moved in a direction from the position 422 to the position 413 while the operation position instruction is continued, as illustrated in FIG. 4C, the changing unit 13 may return the display object to the position of the first display object 403 of FIG. 4B. In this case, for example, when the user flicks the first display object 403 in a direction of the original position of the display object, the changing unit 13 may return the first display object 403 to its original position. In addition, for example, when the user swipes or drags the first display object 403 within a predetermined range from the original display position (e.g., when a distance from the original position is within a threshold value), the changing unit 13 may return the first display object 403 to its original position. As a result, for example, the user may return the first display object 403 to its original position by an operation of returning to a position substantially close to the original position.

Further, when the position of the display object is returned to its original position, the changing unit 13 may display the line 415 of FIG. 4B again by restoring the drawing canceled in the process of step S4 in FIG. 3.

Further, when the position of the display object is returned to its original position, the changing unit 13 may return the position of the display object to its original position only when a confirmation dialog is displayed and an approval operation to approve that the user returns to the original position is received (e.g., a "Yes" button on the dialog is pressed). Further, when the approval operation is not received for a predetermined time (e.g., 3 seconds), the changing unit 13 may erase the dialog and not return the position of the display object to its original position.

<Effects of the Embodiment>

According to the disclosed technique, the display position of the display object is changed according to the movement of the position designated by the operation position instruction from the inside of the region of the display object to the outside thereof. As a result, the user may perform both the drawing on the display object and the movement of the display object without explicitly performing a switching operation between the drawing mode and the move mode.

In addition, it may also be considered that the first display object may be moved by performing the move operation such as a swipe or the like on a predetermined portion (e.g., a bar, etc.) of the first display object set to the drawing mode. In this case, when the first display object and the second display object are displayed at the same time and the second display object is displayed on the bar or the like of the first display object, the user fails to recognize that the first display object is in the drawing mode. Therefore, the user may misrecognize that the first display object is set to the move mode, and perform an operation such as dragging or the like on a drawable region of the first display object in order to move the first display object. In this case, the first display object is not moved, and drawing is erroneously input to the first display object.

In addition, it may be considered that the operation position of a swipe or the like for the bar or the like of the first display object set in the drawing mode is incorrectly swiped or the like by designating a drawable region near the bar or the like in the first display object. Even in this case, the first display object is not moved, and drawing is erroneously input to the first display object.

According to the disclosed technique, even when the second display object is displayed on the bar or the like of the first display object or even when the operation position such as the swipe or the like on the bar or the like is incorrect, the user may perform both the drawing on the display object and the movement of the display object without explicitly performing a switching operation between the drawing mode and the move mode.

<Modifications>

Each functional unit of the information processing apparatus 10 may be implemented by, for example, a cloud computing including one or more computers.

According to one aspect, it is possible to allow a user to perform both drawing and moving of a display object without explicitly switching between a drawing mode and a move mode.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
    drawing a first object in a drawing region at a first location when a processing mode is a drawing mode,
    when the processing mode is the drawing mode, receiving an operation position instruction started in the drawing region;
    drawing a second object in response to the operation position instruction, and creating the second object in the drawing region;
    changing the processing mode to a move mode of moving the drawing region according to movement of an operation position indicated by the operation position instruction to a predetermined region with a side that forms the drawing region as a reference while the operation position instruction is continued; and
    cancelling the second object in the drawing region at the first location,
    wherein the first object is moved along with the drawing region to a second location when the drawing region is moved in the move mode.

2. The non-transitory computer-readable recording medium according to claim 1, wherein the predetermined region is a region outside the drawing region.

3. The non-transitory computer-readable recording medium according to claim 1, wherein the predetermined region is a region inside the drawing region and is defined within a predetermined distance from the side.

4. The non-transitory computer-readable recording medium according to claim 1, the process further comprising:
    changing the processing mode to the move mode according to satisfying at least one of:
    a condition related to a straight line distance by which the operation position is moved after the processing mode is changed to the move mode;
    a condition related to a length of a trajectory by which the operation position is moved after the processing mode is changed to the move mode;
    a condition related to an elapsed time after the processing mode is changed to the move mode;
    a condition related to a value of a ratio between the straight line distance by which the operation position is moved after the processing mode is changed to the move mode and a straight line distance by which the operation position is moved from a start of the operation position instruction to the change of the processing mode to the move mode;
    a condition related to a value of a ratio between the length of the trajectory by which the operation position is moved after the processing mode is changed to the move mode and a length of a trajectory from the start of the operation position instruction to the change of the processing mode to the move mode; and
    a condition related to a value of a ratio between the elapsed time after the processing mode is changed to the move mode and an elapsed time from the start of the operation position instruction to the change of the processing mode to the move mode.

5. The non-transitory computer-readable recording medium according to claim 1, the process further comprising:
    after the processing mode is changed to the move mode, when a position of the drawing region is moved within a predetermined range from a display position of the drawing region before the processing mode is changed while the operation position instruction is continued, returning the display position of the drawing region to a position before changing the processing mode.

6. The non-transitory computer-readable recording medium according to claim 1, the process further comprising:
    in the move mode, determining a display position of the drawing region based on the operation position indicated by the operation position instruction.

7. A display control method, comprising:
    drawing a first object in a drawing region at a first location when a processing mode is a drawing mode,
    when the processing mode is the drawing mode, receiving by a computer an operation position instruction started in the drawing region;
    drawing a second object in response to the operation position instruction, and creating the second object in the drawing region;
    changing the processing mode to a move mode of moving the drawing region according to movement of an operation position indicated by the operation position instruction to a predetermined region with a side that forms the drawing region as a reference while the operation position instruction is continued; and
    cancelling the second object in the drawing region at the first location,
    wherein the first object is moved along with the drawing region to a second location when the drawing region is moved in the move mode.

8. An information processing apparatus, comprising:
    a memory; and
    a processor coupled to the memory and the processor configured to:
    drawing a first object in a drawing region at a first location when a processing mode is a drawing mode,
    when the processing mode is the drawing mode, receiving an operation position instruction started in the drawing region;
    drawing a second object in response to the operation position instruction, and creating the second object in the drawing region;
    changing the processing mode to a move mode of moving the drawing region according to movement of an operation position indicated by the operation position instruction to a predetermined region with a side that forms the drawing region as a reference while the operation position instruction is continued; and cancelling the second object in the drawing region at the first location, wherein the first object is moved along with the drawing region to a second location when the drawing region is moved in the move mode.

\* \* \* \* \*